(12) United States Patent
Czaja et al.

(10) Patent No.: US 8,213,391 B2
(45) Date of Patent: Jul. 3, 2012

(54) TIME SYNCHRONIZATION OF FEMTOCELL

(75) Inventors: Stanislaw Czaja, Cardiff, CA (US);
Mark E. Davis, Carlsbad, CA (US);
Anthony Lee, San Diego, CA (US);
Sang Gook Kim, San Diego, CA (US);
Li-Hsiang Sun, San Diego, CA (US)

(73) Assignees: VIA Telecom, Inc., San Diego, CA (US); IPComm, Cardiff, CA (US); LG Electronics, Inc., Seoul (KR)

( * ) Notice: Subject to any disclaimer, the term of this patent is extended or adjusted under 35 U.S.C. 154(b) by 732 days.

(21) Appl. No.: 12/143,924

(22) Filed: Jun. 23, 2008

(65) Prior Publication Data

US 2009/0092122 A1 Apr. 9, 2009

Related U.S. Application Data

(60) Provisional application No. 60/977,653, filed on Oct. 5, 2007.

(51) Int. Cl.
*H04B 7/216* (2006.01)
*H04J 3/06* (2006.01)

(52) U.S. Cl. ........................ 370/335; 370/350

(58) Field of Classification Search .................. 370/335
See application file for complete search history.

(56) References Cited

U.S. PATENT DOCUMENTS

| 5,508,708 A | 4/1996 | Ghosh et al. |
| 5,920,554 A | 7/1999 | Nakamura et al. |
| 6,049,596 A | 4/2000 | Dumaine et al. |
| 6,141,565 A | 10/2000 | Feuerstein et al. |
| 6,246,673 B1 * | 6/2001 | Tiedemann et al. ........... 370/333 |
| 6,526,039 B1 * | 2/2003 | Dahlman et al. .............. 370/350 |
| 6,711,149 B1 * | 3/2004 | Yano et al. ..................... 370/342 |

(Continued)

FOREIGN PATENT DOCUMENTS

CN 1229563 9/1999

(Continued)

OTHER PUBLICATIONS

Claussen, Holger et al. "Performance of Macro- and Co-Channel Femtocells in a Hierarchical Cell Structure." The 185h Annual IEEE International Symposium on Personal,. Indoor and Mobile Radio Communications (PIMRC'07). 2007 IEEE pp. 1-5.

(Continued)

*Primary Examiner* — Kenny Lin
*Assistant Examiner* — Majid Esmaeilian
(74) *Attorney, Agent, or Firm* — Richard K. Huffman; James W. Huffman (57) ABSTRACT

Time synchronization of an access point base station. The method may include receiving an assignment message from a service provider comprising a plurality of parameters. The plurality of parameters may include an access point base station frequency assignment, a network identifier, an access point base station identifier, a neighbor list, a PN offset, and/or a scrambling code. The access point base station may then synchronize with the macro base station. Synchronizing may include searching for a strongest macro base station in the neighbor list, synchronizing a long code of the access point base station to the macro base station, estimating a propagation delay between the macro base station and the access point base station, and initializing a state of the access point base station PN code using the propagation delay to provide system time synchronization.

10 Claims, 9 Drawing Sheets

U.S. PATENT DOCUMENTS

| | | | |
|---|---|---|---|
| 6,775,318 B2 * | 8/2004 | Chen et al. | 375/149 |
| 6,829,534 B2 | 12/2004 | Fuchs et al. | |
| RE38,808 E | 10/2005 | Schuchman et al. | |
| 6,975,988 B1 | 12/2005 | Roth et al. | |
| 7,064,709 B1 | 6/2006 | Weisenburger et al. | |
| 7,289,473 B1 | 10/2007 | Padovani et al. | |
| 7,388,838 B2 | 6/2008 | Abraham et al. | |
| 7,423,994 B2 * | 9/2008 | Liu et al. | 370/331 |
| 7,500,119 B2 | 3/2009 | Tsai | |
| 7,509,124 B2 | 3/2009 | O'Neil | |
| 7,551,930 B2 | 6/2009 | Lempio et al. | |
| 7,613,444 B2 | 11/2009 | Lindqvist et al. | |
| 7,664,492 B1 | 2/2010 | Lee et al. | |
| 7,756,531 B2 | 7/2010 | Aminzadeh | |
| 7,768,983 B2 * | 8/2010 | Nylander et al. | 370/338 |
| 7,817,997 B2 | 10/2010 | Nylander et al. | |
| 7,830,847 B1 | 11/2010 | Sill et al. | |
| 8,089,400 B1 | 1/2012 | Fang et al. | |
| 2002/0049058 A1 | 4/2002 | Tee | |
| 2002/0187792 A1 | 12/2002 | Kato et al. | |
| 2003/0202564 A1 * | 10/2003 | Ho et al. | 375/147 |
| 2004/0057468 A1 * | 3/2004 | Shieh et al. | 370/514 |
| 2004/0165528 A1 | 8/2004 | Li et al. | |
| 2004/0170221 A1 * | 9/2004 | Storm et al. | 375/149 |
| 2004/0205158 A1 | 10/2004 | Hsu | |
| 2005/0192024 A1 | 9/2005 | Sheynblat | |
| 2006/0166671 A1 | 7/2006 | Rajkotia et al. | |
| 2006/0274743 A1 | 12/2006 | Yegin et al. | |
| 2006/0276201 A1 | 12/2006 | Dupray | |
| 2007/0105568 A1 | 5/2007 | Nylander et al. | |
| 2007/0183427 A1 | 8/2007 | Nylander et al. | |
| 2007/0258395 A1 | 11/2007 | Jollota et al. | |
| 2008/0076392 A1 | 3/2008 | Khetawat et al. | |
| 2008/0076398 A1 | 3/2008 | Mate et al. | |
| 2008/0096527 A1 | 4/2008 | Lamba et al. | |
| 2008/0130596 A1 | 6/2008 | Kalhan | |
| 2008/0188265 A1 | 8/2008 | Carter et al. | |
| 2008/0244148 A1 * | 10/2008 | Nix et al. | 710/313 |
| 2008/0287153 A1 | 11/2008 | Fullam | |
| 2009/0029645 A1 | 1/2009 | Leroudier | |
| 2009/0034482 A1 * | 2/2009 | Hahm et al. | 370/335 |
| 2009/0042536 A1 | 2/2009 | Bernard et al. | |
| 2009/0052395 A1 | 2/2009 | Bao et al. | |
| 2009/0061892 A1 | 3/2009 | Lee et al. | |
| 2009/0082010 A1 | 3/2009 | Lee et al. | |
| 2009/0092078 A1 | 4/2009 | Czaja et al. | |
| 2009/0092096 A1 | 4/2009 | Czaja et al. | |
| 2009/0092097 A1 | 4/2009 | Nylander et al. | |
| 2009/0093246 A1 | 4/2009 | Czaja et al. | |
| 2009/0093252 A1 | 4/2009 | Czaja et al. | |
| 2009/0098873 A1 | 4/2009 | Gogic | |
| 2009/0135758 A1 | 5/2009 | Alper et al. | |
| 2009/0298475 A1 | 12/2009 | Czaja et al. | |
| 2009/0298515 A1 | 12/2009 | Czaja et al. | |
| 2010/0184421 A1 | 7/2010 | Lindqvist et al. | |

FOREIGN PATENT DOCUMENTS

| | | |
|---|---|---|
| CN | 1783822 | 6/2006 |
| CN | 1894979 A | 1/2007 |
| WO | WO2007016499 | 2/2007 |

OTHER PUBLICATIONS

"Position Determination Service Standard for Dual Mode Spread Spectrum Systems." 3rd Generation Partnership Project 2 "3GPP2", 3GPP2 C.S0022-0 Version 3.0, Feb. 16, 2001. pp. 1-146.

* cited by examiner

TIME SYNCHRONIZATION OF FEMTOCELL

PRIORITY INFORMATION

This application claims benefit of priority of U.S. provisional application Ser. No. 60/977,653 titled "Femto-Cell Time Synchronization and Time Accuracy" filed Oct. 5, 2007, whose inventors are Stash Czaja, Anthony S. Lee, and Mark Davis, which is hereby incorporated by reference in its entirety as though fully and completely set forth herein.

FIELD OF THE INVENTION

The present invention relates to the field of cellular networks, and more particularly to time synchronization of a femtocell.

DESCRIPTION OF THE RELATED ART

In recent years, the use of mobile devices and, in particular, cellular telephones has proliferated. As a result, focus on reception for cellular telephones or other mobile devices, especially in homes or primary residences, has increased. Additionally, typical users of mobile devices use or subscribe to data services for their homes. As a result, femtocells (more generally called access point base stations) have begun to be used in the home. Femtocells provide cellular service to mobile devices using the data service of the user. Thus, these femtocells provide excellent service where mobile devices are used most and typically make use of data plan services (e.g., DSL, fiberoptic, cable, WiMAX, etc.), which may not require a nearby macro cell of the cell phone service provider. However, femtocells typically require manual set up, e.g., by a technician, in order to operate efficiently. Thus, improvements in installation of femtocells would be desirable.

SUMMARY OF THE INVENTION

Various embodiments are presented of a method for synchronizing timing of an access point base station.

In one embodiment, the method may include the access point base station receiving an assignment message from a service provider comprising a plurality of parameters, e.g., during automatic provisioning of the access point base station. The plurality of parameters may include an access point base station frequency assignment, a network identifier, an access point base station identifier, a neighbor list, a scrambling code, and/or a PN (pseudo noise) code offset.

In some embodiments, the assignment message may be received in response to the access point base station connecting to the service provider and the access point base station transmitting an activation request message to the service provider The access point base station may then synchronize timing with the macro base station.

In one embodiment, synchronizing may include searching for a strongest (or detectable) macro base station in the neighbor list, synchronizing a long code of the access point base station to the macro base station, estimating a propagation delay between the macro base station and the access point base station, and/or initializing a state of the access point base station PN code using the propagation delay to provide system time synchronization. Alternatively, or additionally, synchronizing may include searching for a strongest macro base station in the neighbor list, performing slot boundary synchronization by processing a PSCH (primary synchronization channel) of the macro base station, and performing frame boundary synchronization by processing a SSCH (secondary synchronization channel) of the macro base station. Performing the slot boundary synchronization and performing the frame boundary synchronization may provide frame synchronization between the access point base station and the macro base station.

Synchronizing may also include tuning a receiver of the access point base station to a neighbor downlink frequency specified in the neighbor list. The access point base station receiving the assignment message and the access point base station synchronizing with the macro base station may be performed over an IP connection.

The method may further include adjusting the system time or timing of the access point base station one or more times to provide time synchronization. For example, the method may adjust the timing in order to provide frame synchronization. Adjusting the system time or timing may include using clock calibration of a clock of the access point base station. Alternatively, or additionally, adjusting may include tracking a carrier frequency of an access terminal or base station and calibrating timing of the access point base station according to the carrier frequency. In one embodiment, adjusting the system time or timing may include the access point base station synchronizing with the macro base station (e.g., as described above). In some embodiments, the adjusting may be performed in response to a message received from the service provider (e.g., when the service provider determines that the access point base station is no longer within a tolerance level of synchronization.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Incorporation by Reference

U.S. provisional application Ser. No. 60/977,653, titled "Automatic Provisioning of a Femtocell" filed Oct. 5, 2007, whose inventors are Stash Czaja, Anthony S. Lee, and Mark Davis is hereby incorporated by reference in its entirety as though fully and completely set forth herein.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Figure 1:
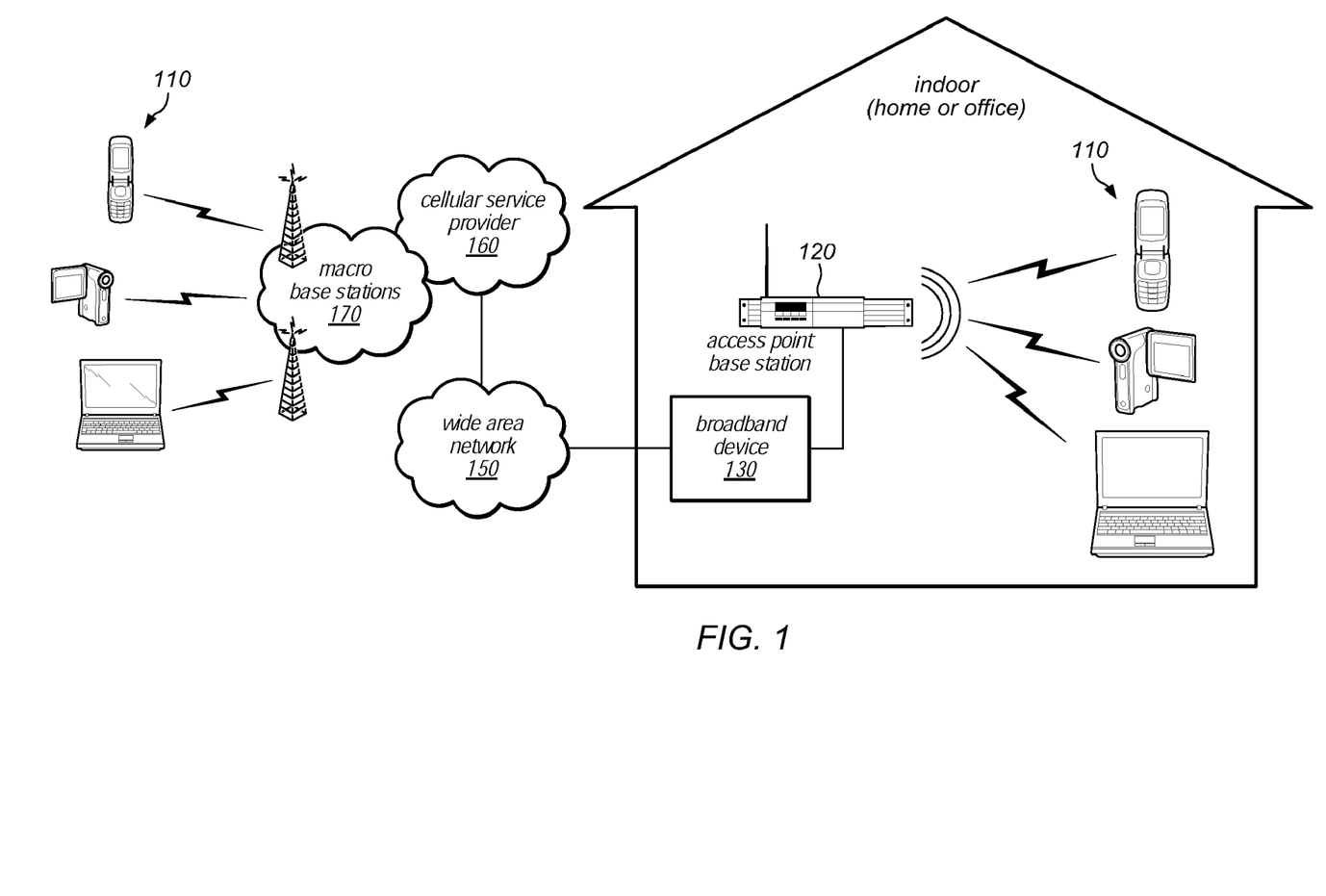
FIG. 1 is an exemplary system including an access point base station according to one embodiment.
Figure 2:
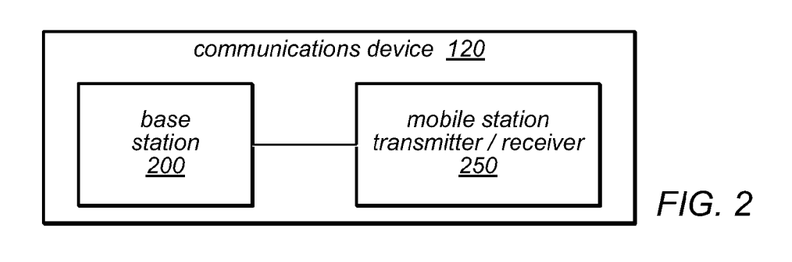
FIG. 2 is an exemplary general block diagram of the access point base station according to one embodiment.

FIGS. 1 and 2—Exemplary Block Diagrams of a Communications System

FIG. 1 illustrates an exemplary system including an access point base station (e.g., a femtocell). The term "access point base station" is intended to include typical definitions (as known by those of skill in the art) of femtocells, home base stations, personal access points (PAPs), and personal 2G-3G (or nG) base stations, among others. In some embodiments, the access point base station may include capabilities of a mobile station transmitter/receiver (transceiver) as well as further functionality described in more detail below. Various embodiments of a method to automatically provision (i.e., setup) the access point base station (e.g., by providing appropriate operational parameters) are presented below.

As shown, FIG. 1 illustrates a home which may include one or more access terminals 110, an access point base station 120, and a broadband device 130. As shown in FIG. 2, the access point base station 120 may include base station circuitry 200 which may be coupled to mobile station transceiver circuitry 250. The base station circuitry 200 and/or the mobile station transceiver circuitry 250 may include or be coupled to a processor (not shown) and memory (not shown) coupled to the processor to implement their functionality. In one embodiment, each of the base station circuitry and the mobile station transceiver circuitry may have independent processors and memory; however, these components may share a processor and memory.

As shown in FIGS. 1 and 2, the base station circuitry 200 and the mobile transceiver circuitry 250 may be included in a same housing of the access point base station 120. The housing may be plastic or metal (e.g., aluminum or other metals) and may take a box-like design. In one embodiment, the housing may include one or more lights or light emitting diodes (LEDs) which indicate the activity or operation of various components of the access point base station 120 (e.g., operation of the base station circuitry 200 and/or the mobile station transceiver circuitry 250, among others).

The housing may include a power supply for providing power to the components of the access point base station 120. The housing may also include one or more ports for coupling to other devices or communications devices. For example, in one embodiment, the housing may include a universal serial bus (USB) port (or other type of port, such as firewire, among others) for attaching devices (e.g., printers, personal music players, personal digital assistants, cell phones, external hard drives, testing devices, media controllers, etc.). Additionally, or alternatively, the one or more ports may include Ethernet ports (e.g., for coupling to a router or the communications device 130, among others), fiber ports, cable ports, etc. In some embodiments, the ports may be implemented as an interface or an interconnection network coupled to the other devices via a wired or wireless connection.

The access point base station 120 may operate to receive wireless communication (e.g., radio frequency (RF) communication) from the one or more access terminals 110 and provide corresponding signals or communication with mobile operator(s) (or cellular service providers) corresponding to the providers of the access terminals 110. More specifically, the access point base station 120 may operate to provide communication for the access terminals 110 using the broadband communications device 130 over an IP wide area network 150 (e.g., the Internet, via the user's internet service provider (ISP)). The broadband device 130 may thus communicate with the cellular service provider 160 via the Internet.

Moreover, the IP wide area network 150 may be private or dedicated to the user using various technologies, for example, lease line, frame relay, digital subscriber line (DSL), or dial-up service. The IP communication may be encrypted or IP tunneling may be used if supported by the IP wide area network 150. The cellular service provider 160 may also be coupled to macro base stations 170 (sometimes referred to as cell phone towers or macro cell stations) which may operate to provide service to the access terminals 110 when outside of range of the access point base station 120 and/or when the access point base station 120 is disabled or non-operational. Thus, the access point base station 120 may provide bi-directional communication for the access terminals via an IP network such as the Internet. Stated another way, users in the home may use their cell phones which communicate with the access point base station, wherein the user's voice communications may be transmitted/received to/from the cellular service provider over an IP network.

The mobile station transceiver circuitry 250 may operate to communicate with the access terminals 110 and the cell towers 170 using wireless cellular communication such as RF. However, it should be noted that in some embodiments, the mobile station transceiver circuitry 250 may not communicate directly with the access terminals 110; instead, it may receive signals from the access terminals 110 via another component, such as the base station 200. The mobile station transceiver circuitry 250 may be used for loopback testing, reporting of environmental factors, and to provide redundancy when the IP network is down, thus improving cellular reception in the home. Thus, in some embodiments, the mobile station transceiver circuitry 250 may be used to monitor environmental factors of the access point base station 120 (e.g., neighboring macro cell stations, neighboring femtocells, radio frequency traffic in the home, etc.) and may convey that information (e.g., to the service provider via the macro cell station or the IP network, as desired) for configuration of the access point base station 120. This information may be critical during initial (e.g., automatic) set up of the access point base station 120. Correspondingly, macro base station 170 and/or the service provider 160 via the wide area network 150 may communicate with the access point base station 120 during installation of the access point base station 120 to perform set-up operations, e.g., automatically. The mobile station transceiver circuitry 250 may also allow for initiation of testing (e.g., loop-back testing) of the access point base station 120, e.g., in response to signals from the macro base station 170.

The access terminals (also referred to as mobile devices) 110 may include any type of device which may be used in a cellular network, e.g., RF communication. Access terminals 110 may include cellular (or cell) phones (including smart phones), personal digital assistants (PDAs) with mobile communication capabilities, laptops or computer systems with mobile communication components, and/or any device which is operable to communicate with a cellular network. The access terminals may use various different protocols, e.g., cdma2000 (1xRTT and EV-DO), UMB, UMTS, LTE, WiMax, or others). Thus, the access point base station may support any or at least a subset of the protocols used by the access terminals 110, e.g., without modification to the standards or protocols for supporting existing access terminals.

The broadband device 130 may include a router and/or cable/dsl modem for connecting to the wide area network 150. In one embodiment, the broadband device 130 may include a wireless router (or one or more wireless hubs) which may provide wireless communication (e.g., using 802.11x communication technology) for the access point base station 120. Additionally, the broadband device 130 may be connected to the wide area network 150 via wired (e.g., cable, DSL, fiberoptic, power lines, etc.) or wireless means (e.g., WiMAX or other wireless communication methods), as desired. Alternatively, or additionally, the broadband device 130 may be coupled to the access point base station 120 remotely, e.g., via a WiMAX wireless connection. Furthermore, in one embodiment, the access point base station 120 may include the broadband device 130 (e.g., in an all-in-one solution for the user).

Thus, the access point base station 120 may provide access to the cellular network via the wide area network 150 (e.g., the Internet) using the broadband device 130 (wired or wirelessly) and may include the mobile station transceiver 250.

Figure 3:
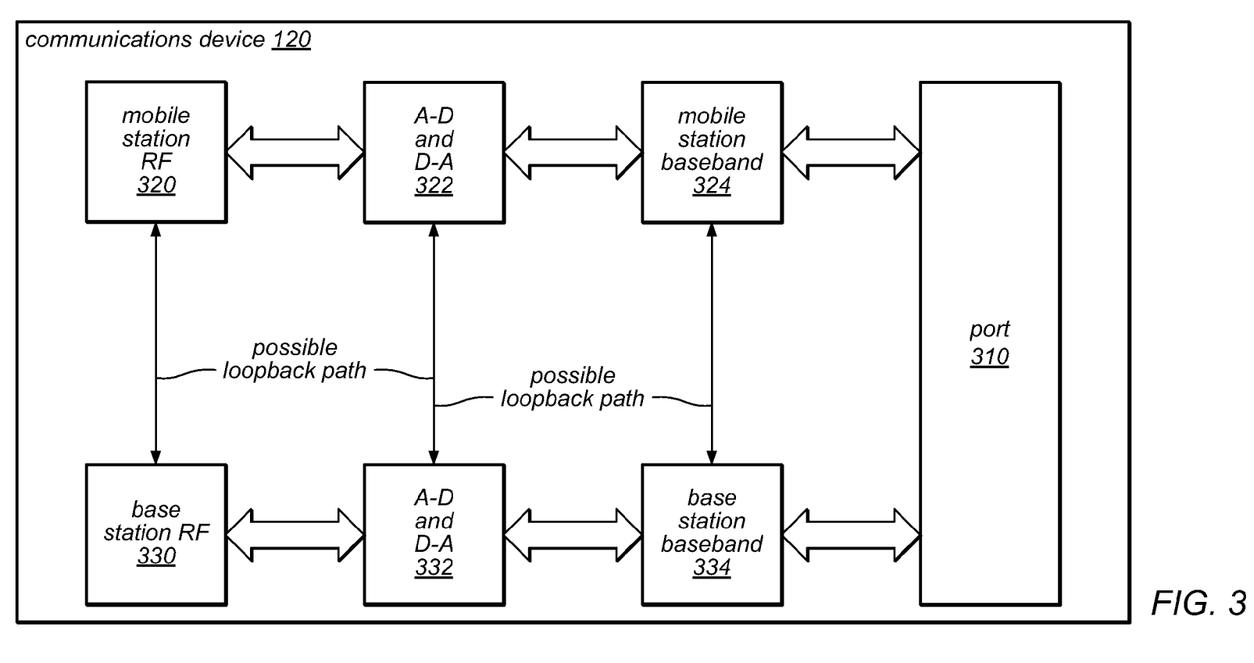
FIG. 3 is a flowchart of an exemplary method for automatically provisioning the access point base station, according to one embodiment.

FIG. 3—Exemplary Block Diagram of the Communications Device

FIG. 3 illustrates an exemplary block diagram of the communications device 120. As shown, the communications device 120 may include a port 310 (or method of access) to reach the wide area network 150 provided by the broadband communications device 130. As indicated above, the port 310 may provide for wired or wireless communication with the broadband communications device 130. In some embodiments, the port 310 may be implemented as an interface or an interconnection network coupled to the broadband communications device 130, femtocell base station 200, and/or mobile station transceiver 250. A mobile station baseband 324 and base station baseband 334 may be coupled to the port 310. Each baseband component may be in turn connected to analog to digital and digital to analog converters (322 and 332 respectively) which may be connected to respective transceivers (mobile station R/F 320 and base station R/F 330). Various ones of these components may be coupled for loopback testing (e.g., the mobile station R/F 320 to base station R/F 330, the two digital/analog converters 322 and 322, and/or the two baseband components 324 and 334, among other possible connections). Note that this block diagram is exemplary only and that various ones of the blocks may be replaced, modified, or connected in different manners, as desired.

Figure 4:
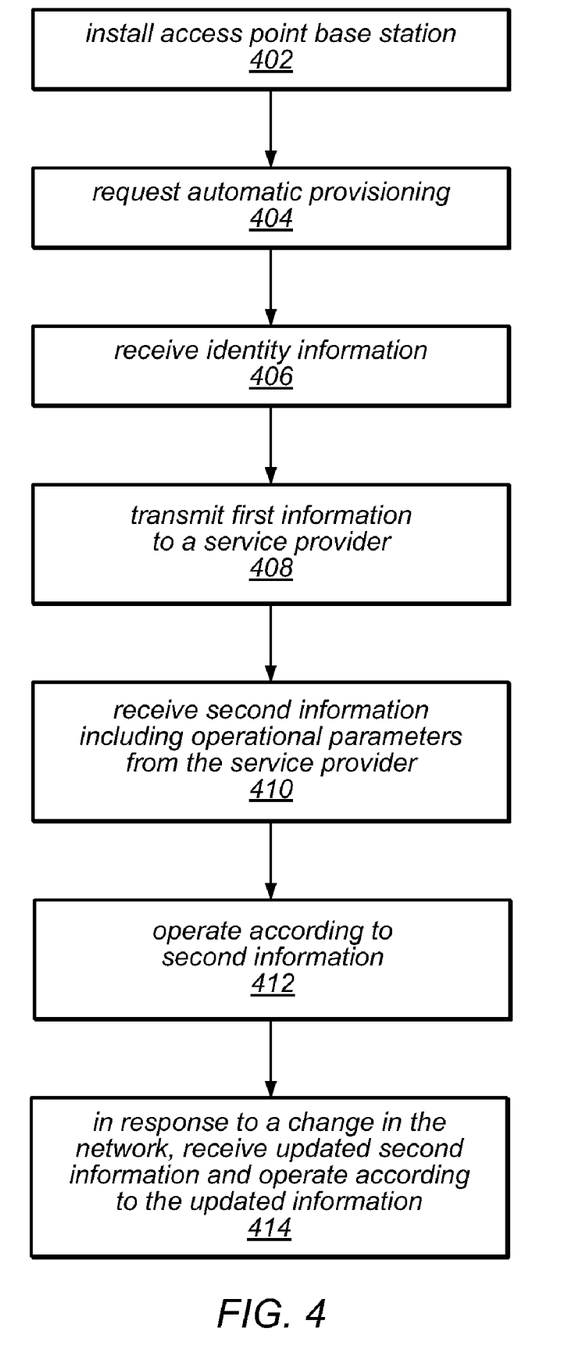
FIG. 4 is a graph illustrating handoff areas for a macro base station and an access point base station, according to one embodiment.

FIG. 4—Automatic Provisioning of an Access Point Base Station

FIG. 4 illustrates an exemplary method for automatically provisioning an access point base station. The method shown in FIG. 4 may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows. In the following description, references to the "access point base station" refer to the access point base station 120.

In 402, the access point base station may be installed, e.g., by a user, possibly in a home. However, installation may occur by a service provider technician or other entity, as desired. Installation of the access point base station may include providing power to the access point base station and coupling the access point base station to a broadband communications device (e.g., using wired or wireless means). In some embodiments, the user may only be required to provide power to the access point base station and couple the access point base station to the broadband device. In other embodiments, further connection settings may be required (e.g., to set up the wireless or network settings of the access point base station). Furthermore, in some embodiments, the access point base station may be installed in a new location by moving the access point base station from an old location. In this example, one or more of the steps described below may not be performed if such information has already been received from a previous installation (e.g., acquiring identification information as in 406).

Figure 5:
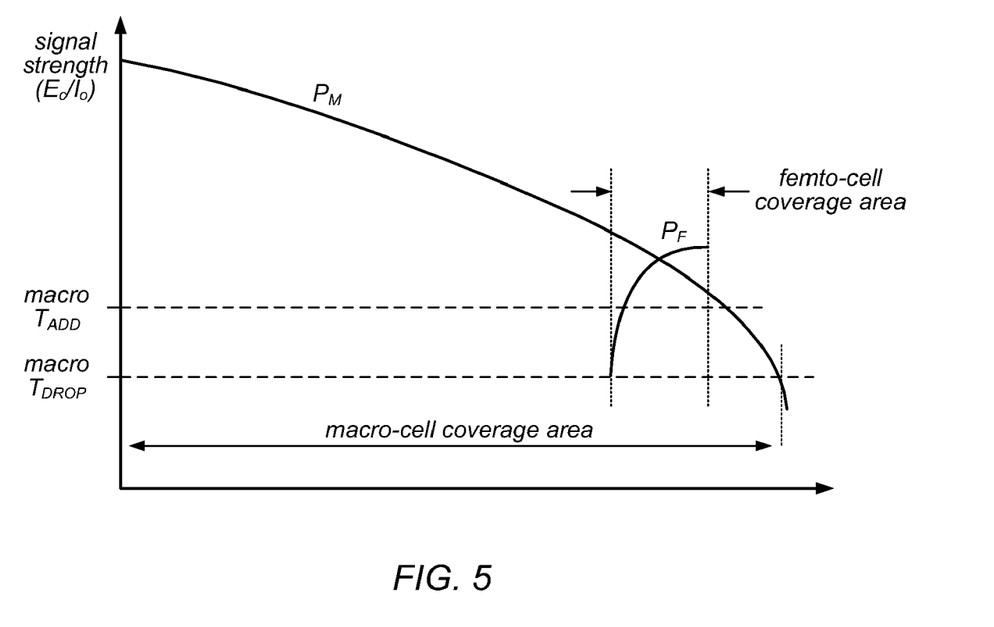
FIG. 5 is a diagram illustrating service areas for a macro base station and two access point base stations, according to one embodiment.

The access point base station may be installed within or near a macro area of a macro cell base station which provides wireless communication in the macro area for the service provider. Thus, the access point base station may provide wireless communication for the service provider within a local area, possibly inside of or intersected partially with a macro area provided by the macro base station. The term "local area" may be distinguished from the "macro area" coverage provided by a macro base station or cell tower. Thus the term "local area" may refer to an area of coverage ranging from 50-200 meters in radius from the access point base station, and typically provides coverage for (or proximate to) a single home or business. Note that the local area may be configured by the user of the access point base station or by the service provider, e.g., to cover only an area around a home or apartment and/or to reduce interference of other base stations. FIG. 5 shows a graph corresponding to this scenario. As shown, the access point base station coverage area (corresponding to the access point base station described herein) is within the macro base station coverage area. The indicated region illustrates where handoffs between the access point base station and the macro base station may occur, e.g., based on signal strength ratios. Further descriptions of the handoff procedures are provided below.

Figure 6:
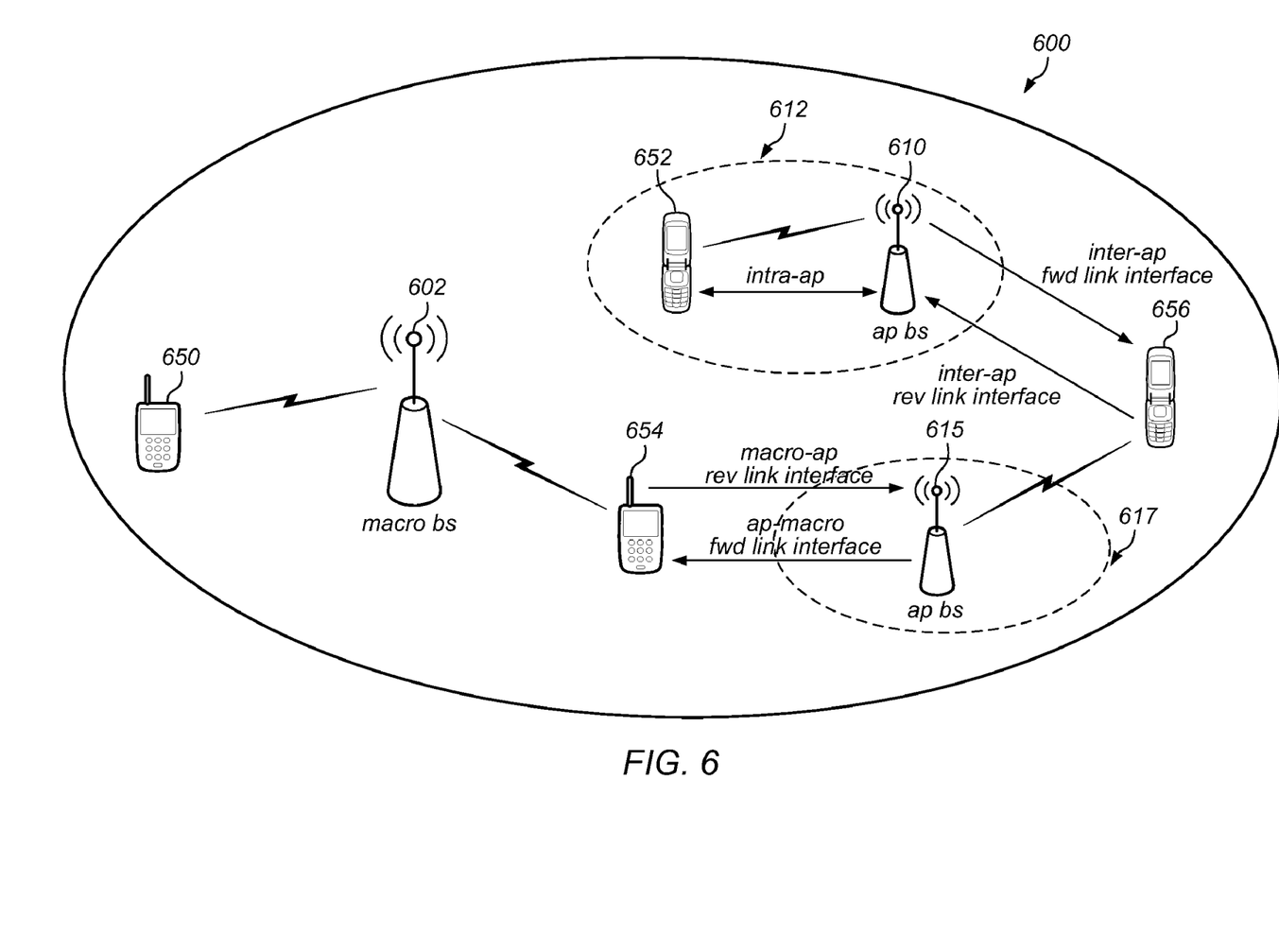
FIG. 6 is a flowchart of an exemplary method for synchronizing system timing of an access point base station, according to one embodiment.

FIG. 6 also illustrates a macro base station 602 which provides service in a macro area 600 to access terminals within the macro area (such as, for example, access terminal 650). As shown, two access point base stations 610 and 615 may provide service in local areas 612 and 617. More specifically, access point base station (ap bs) 610 may provide service for access terminal 652. As also indicated, there may be macro-ap reverse and forward link interference for access terminal 654 between the macro base station 602 and the access point base station 615 as well as inter-ap forward and reverse link interference for access terminal 656 between the access point base stations 610 and 615. These interferences may be mitigated or managed according to various power, handoff, and hysteresis parameters, described in more detail below.

In 404, the access point base station may send a message or otherwise request automatic provisioning of the access point base station from a wireless service provider. The message (and possibly other messages described below) may be defined as a new set of classes in the SNMP, CORBA, and XML models and may be administered over network management protocols, such as OAM, among other possibilities. In some embodiments, the access point base station may send the message over an IP network, e.g., provided by the broadband communications device. Alternatively (or possibly if the broadband communications device is not currently providing a network connection), the access point base station may send the message over the wireless network of the service provider, e.g., using a neighboring macro base station or possibly another access point base station.

In 406, the access point base station may receive identity information from the service provider. The identity information may uniquely identify the access point base station in the network of the service provider, and may be used in requests between the service provider and the access point base station.

In 408, the access point base station may transmit first information to the service provider, e.g., in one or more messages, possibly including an activation request message (ARM). The first information may be primarily provided over the IP network, e.g., provided by the broadband communications device. However, similar to descriptions above, the first information may be provided via the macro base station of the service provider, e.g., when the IP network is unavailable. The first information may include identity information and/or a plurality of parameters which describe various aspects of the access point base station. For example, the plurality of parameters may indicate location information, environmental information, capability information, and/or other information related to the access point base station.

More specifically, the first information may include the location information of the access point base station, e.g., in terms of latitude and longitude, among other possibilities. The location information may be determined by the service provider and/or the access point base station, e.g., using standard network assisted location procedures. In some embodiments, the access point base station may determine its location information by communicating with a neighboring macro base station (or a plurality of neighboring base stations), e.g., by determining offset information and the location of the neighboring base station(s). Alternatively, in one embodiment, a GPS receiver may be used to provide the location information (e.g., coupled to or comprised in the access point base station).

As indicated above, the first information may further include capability information such as supported RAT technologies, maximum number of users and data rates, cell coverage characteristics (e.g., to allow maximum power allocation), etc. The capability information may include propagation characteristics of the environment in which the access point based station is located; however, this information may also or instead be provided in the environmental information parameters. One or more portions of the first information (e.g., environmental characteristics, location information, offset information, etc.) may be determined using a mobile station transceiver of the access point base station.

In some embodiments, the first information may include a preferred terminal list. The preferred terminal list may be used to determine whether access terminals can use the access point base station or for assigning priority of access terminals for use of the access point base station. In some embodiments, the user may provide input (e.g., to a user interface of the access point base station) for specifying the access terminals of the preferred terminal list. Alternatively, or additionally, users may enter in a secret code, e.g., using their access terminal as an input device, to use (or get priority use of) the access point base station. In some embodiments, the owner or administrator of the access point base station may define a priority (e.g., using tiered rankings, explicit ordering, or other methods) among the access terminals in the list to define how the access point base station allots resources to those access terminals on the list. However, it should be noted that the preferred terminal list may not be provided by the access point base station during provisioning of the access point base station. For example, the preferred terminal list may be updated or provided by the access point base station at any time after provisioning, as desired.

Similarly, the first information may include an access policy (or desired access policy). For example, the user may provide input of a desired access policy of the access point base station. In some embodiments, the access policy may have one or more of the following options: open (e.g., where all access terminals may access the access point base station), restricted (e.g., where all access terminals in the access terminal list are permitted unrestricted access where other access terminals have limited or no access), and/or private (e.g., where only access terminals on the access terminal list are allowed to use the access point base station). Similar to above, this information may or may not be provided during provisioning and may be provided or changed at any later point as desired. However, in some embodiments, the user may not be able to control the access policy of the access point base station; instead the service provider may ultimately assign the policy. Thus, various types of information may be provided to the service provider in the first information.

In 410, the access point base station may receive second information by an assignment message from the service provider (e.g., over the IP network) which includes information and/or one or more operational parameters. In 410 the access point base station may receive the second information (including the operational parameters) and store the operational parameters in the appropriate memory location in the base station such that these parameters may be accessed and used by software executing on the base station. Thus, receipt and storage of the operational parameters may automatically provision or configure the access point base station without any direct or manual user input required (other than connecting the base station to power and a broadband connection).

The second information may be determined (by the service provider) based on the first information (e.g., measurement information, location information, signal measurement and/or other information) provided by the access point base station. The operational parameters may include hand off parameters for handling handoffs of access terminals between the access point base station and the macro cell base station. In one embodiment, the second information may include an access point base station frequency or channel(s) assignment, a network SID and/or NID, and/or the identification of the access point base station, among others. The second information may include a PN offset (for cdma2000 protocols) and/or a cell scrambling code (for UTMS). The PN offset and/or cell scrambling code may be based on the location of the access point base station and may be used to manage the interference of the access point base station to the surrounding network.

The second information may include a neighbor list, which may include a list of neighboring macro base stations and/or other access point base stations. As indicated above, the second information may include PN offsets (e.g., long and/or short PN offsets) or scrambling code(s) for UMTS. These may be used to aid in the interference management of the access point base station. In some embodiments, the neighbor list may be updated whenever the neighbor list changes and/or at various periodic time intervals. The second information may include a maximum (transmit) power parameter which may be used to control the interference of the access point base station to the surrounding network (e.g., macro base stations or other access point base stations which may be indicated in the neighbor list). The maximum power parameter(s) may be determined based on the desired coverage area of the access point base station as well as the desired quality of service (e.g., for the user's home). The power parameter(s) may also be determined based on household propagation models, measurements of signals of the access point base station's neighboring base stations (macro or otherwise), and/or other factors. Additional parameters may include overhead channels power allocation (e.g., PiCH for the 1xRTT), etc.

The second information may further include an admission policy mode, which, as indicated above, may allow for open, restricted, or private access to the access point base station resources. Furthermore, the second information may include a preferred terminal list, which, as also indicated above, may be used to manage service priority for access terminals. For example, in a private mode, the access point base station may restrict access only to those access terminals on the list, where for a semi-open policy, the listed access terminals may be given service priority. The admission policy and/or preferred terminal list may be determined based on the owner's service agreement, the location of the access point base station, the subscriptions of other customers near the location of the access point base station, the admission policy and/or a preferred terminal list provided by the access point base station (e.g., as provided by the user), the neighbor list, and/or other information.

The second information may further include handoff offsets or parameters related to handoffs, which may indicate macro to access point base station drop threshold(s) and/or access point base station to macro drop threshold(s). For example, the second information may provide handoff offset (HO) thresholds and hysteresis information, e.g., to facilitate handoff regardless of the access point base station within the macro coverage area.

The HO thresholds may comprise handoff parameters, such as macro to access point base station (or femto) drop threshold "$MSFDT_{DROP}$" and access point base station to macro drop threshold "$F2FDT_{DROP}$", among others. The $MSFDT_{DROP}$ parameter may specify a signal strength ratio used to determine when to perform a handoff from the macro base station to the access point base station when an access terminal is moving from the macro area (service being provided by the macro base station) to the local area. Conversely, the $F2FDT_{DROP}$ parameter may specify a signal strength ratio used to determine when to perform a handoff from the access point base station to the macro base station when an access terminal is moving from the local area (service being provided by the access point base station) to the macro area.

The hysteresis information may comprise one or more parameters that indicate a history of which of the macro base station or the access point base station has most recently provided service to the access terminal. In one embodiment, a positive (e.g., in dB) value of $MSFDT_{DROP}$ parameter provides a hysteresis during the macro-to-femto HO, while a negative value of $F2FDT_{DROP}$ provides hysteresis during the femto-to-macro HO. Those hysteresis may protect against frequent switching (ping-pong), between macro and femto service.

In one embodiment, the parameters may relate to optimal HO completion time or thresholds related to the time of HO completion. The HO parameters may help secure seamless HOs to/from other base stations, help reduce interference to the remaining users and/or surrounding network, and/or improve system capacity and overall quality of service by reducing the number of active code channels. These operational parameters/information (and possibly other parameters) may be semi-static and valid until the next message is sent from the service provider and/or until other changes in the location, environment, and/or user settings (among others) of the access point base station. Further descriptions regarding handoffs between the access point base station and a neighboring base station are provided in further flowcharts below.

The second information may further include additional parameters such as access point base station time re-sync (which may be sent by the network upon a loss of link(s) synchronization with the neighbor network), channels assignments (CAM messages which may be used to aid in the interference mitigation management of the access point base station). In some embodiments, the second information (and more particularly the operational parameters) may be determined using a coverage area propagation model. For example, this determination among others of the information and operational parameters may be performed or determined by one or more servers of the service provider.

The coverage area propagation model may include a series of typical residence/office layouts including such parameters as: type—stand alone/attached/apartment; area, number of rooms and levels; construction type—concrete, wood, cardboard, etc. Those typical layouts may be included in an installation SW (disc). Various procedures and the parameters (area, construction type, etc) may be entered by the user (or detected or located in a database), e.g., upon installation of the femtocell, and then sent in a message (such as the ARM message described herein) to the service provider. When the message is received, that information may be mapped into propagation models maintained by the service provider to derive, for example, the AP maximum transmit power. The variance between the typical and the actual residence layout and the actual location of the access terminal within the residence may be covered by the range of $MSFDT_{DROP}$ and $F2FDT_{DROP}$ parameters.

In 412, the access point base station may operate based on the second information, e.g., the one or more operational parameters of the second information. Operating according to the parameters may provide reduced interference caused by the access point base station (e.g., in the operation of neighboring macro or femto cells), and may allow for efficient handoffs between the access point base station and other base stations in the area (further descriptions provided below). Thus, the access point base station may be automatically configured or provisioned without requiring the user to manually configure the access point base station, which typically requires a level of expertise greater than that of average users.

In 414, in response to a change in the network, the access point base station may receive updated operational parameters from the service provider (e.g., automatically). Changes may include addition or, removal of access point base stations, increases or decreases in load in the network (e.g., causing the service provider to change various parameters to perform load balancing in the area), changes in environmental conditions, detection of certain types of packages or messages in the network, loss or decrease of power to various base stations, and/or any other changes which may affect the parameters of the access point base station.

In some embodiments, the change may be initially determined by the access point base station and reported to the service provider before receiving the updated operational parameters. However, in some embodiments, the service provider may provide the updated parameters without first receiving a message from the access point base station. For example, as indicated above, a new access point base station may have been added to the area, and in response to provisioning of the new access point base station, operational parameters of the access point base station may need to be changed, e.g., as determined by the service provider. Accordingly, the access point base station may operate based on the updated operational parameters, which may reduce interference caused by the access point base station in the changed network. The updated parameters may also allow for more efficient handoffs in the changed network.

Additionally, during operation, all overhead messages (such as PCH, etc.) may be rebroadcast in the access point base station coverage area to provide reliable delivery of pages during Idle HO. Furthermore, each time a new user and/or a new resource is added to the existing users (e.g., defined with the Channel Assignments Messages), the assignment may be indicated (e.g., sent over the OAM interface or over the air) to the access point base station to aid in interference mitigation.

Note that various ones of the method elements described above (more specifically, 404, 406, 408, 410, and/or 412) may be performed automatically. As used herein, the term "automatically" is used to mean that the actions are not performed by a user. For example, in the descriptions above, a user may simply instruct the access point base station to begin a provisioning procedure to set up the access point base station and the method elements described above may be performed without any further user input specifying the steps. Alternatively, the access point base station may automatically begin the set up as soon as the access point base station is installed or otherwise coupled to the wide area network (e.g., the Internet). Thus, in this embodiment, the user may not provide any input during the provisioning of the access point base station. However, it should be noted that there may be embodiments where user input is required or requested during the automatic process (e.g., confirmation of steps or requests for certain user parameters).

Figure 7:
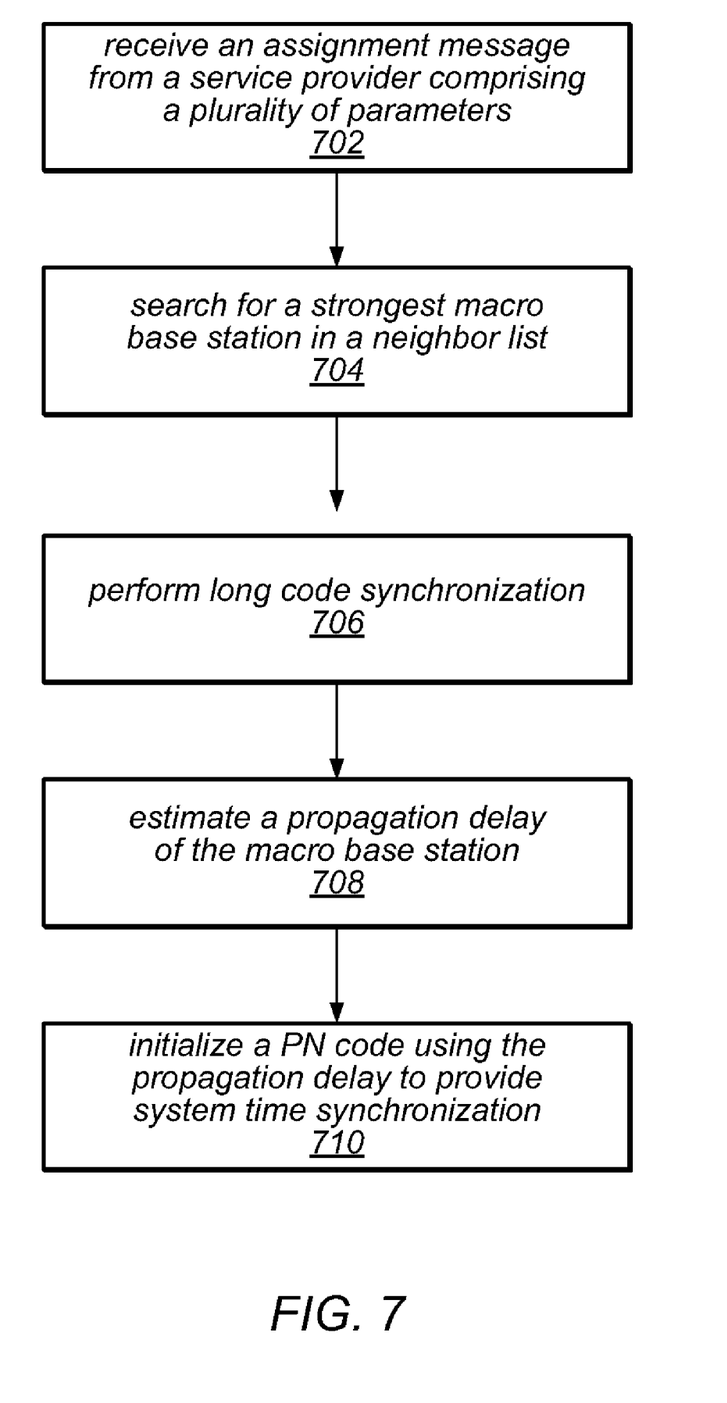
FIG. 7 is a timing diagram corresponding to the method of FIG. 6, according to one embodiment.

FIG. 7-10—Method for Synchronizing Timing of an Access Point Base Station FIGS. 7-10—illustrate an exemplary method for synchronizing timing of an access point base station. FIG. 7 may be especially useful in systems utilizing cdma2000 (e.g., 1xRTT and EV-DO) while FIG. 9 may be especially useful in system utilizing UTMS. The method shown in these Figures may be used in conjunction with any of the computer systems or devices shown in the above Figures, among other devices. In various embodiments, some of the method elements shown may be performed concurrently, performed in a different order than shown, or omitted. Additional method elements may also be performed as desired. As shown, this method may operate as follows.

In 702, an assignment message may be received from a service provider (e.g., over a wired or IP connection, such as those described above). The assignment message may be received during automatic provisioning of the access point base station, e.g., as described above in FIG. 4 For example, the access point base station may first connect to the service provider (e.g., using an IP or wired connection) and transmit an activation request message to the service provider (e.g., for automatic provisioning). Accordingly, the assignment message may be received in response in 702. As indicated in descriptions above, the assignment message may include a plurality of parameters. For example, the plurality of parameters may include an access point base station frequency assignment, a network identifier, an access point base station identifier, a neighbor list, a PN offset, and/or a scrambling code, among other possible parameters. Note that in some embodiments, the method of FIG. 7 may be particularly devoted to systems utilizing a PN offset. Accordingly, in such embodiments, the parameters may not include a scrambling code.

In order to successfully provide communication for access terminals and/or perform hand offs, the access point base station may be required to synchronize its long and PN codes with the rest of the network. For cdma2000 systems, the network timing, referred to jointly as System Time and comprising of the PN spreading code and the Long PN code, may be synchronized to the GPS timing. The start of the System Time may be referred to the start of the GPS time and may be maintained to various degree of accuracy (e.g., macro BS time must be very accurate), by each device operating within the cdma2000 system: The System Time may be kept on each macro base station stored in the neighbor list which may be received in 702. In order to provide satisfactory quality of service, the access point base station may be required to maintain its clock accuracy within the smaller of an AT search window or an AT combiner time spread. Accordingly, the access point base station may begin a synchronization process to synchronize timing of the access point base station with the macro base station / service provider timing (e.g., using the IP or wired connection).

Figure 8:
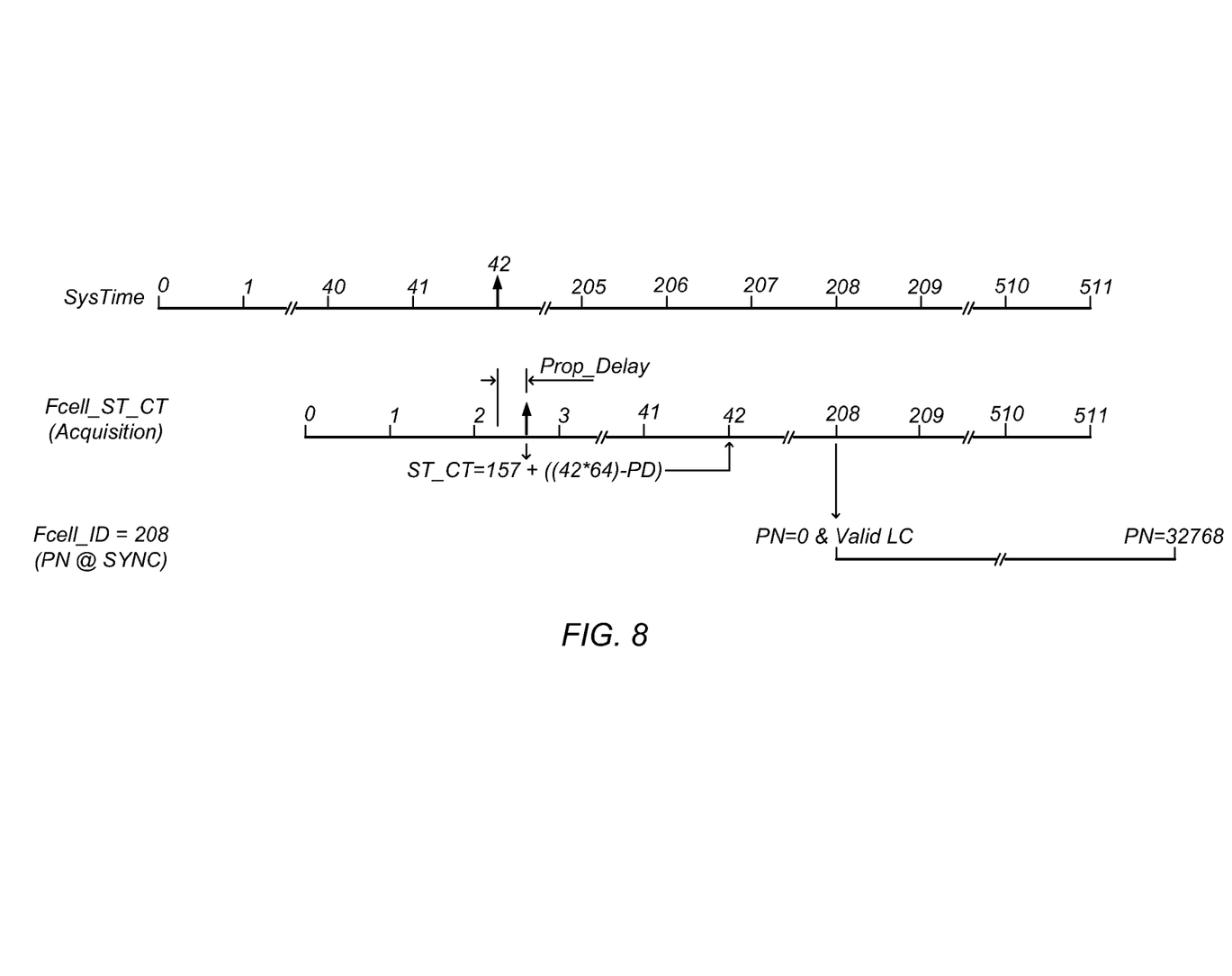
FIG. 8 is a flowchart of an exemplary method for synchronizing system timing of an access point base station, according to one embodiment.

The synchronization process may include 704, 706, and/or 708 described below. Additionally, in some embodiments, the synchronization process may include (e.g., initially) tuning a receiver of the access point base station to a neighbor downlink frequency (e.g., of a macro base station) specified in the neighbor list. Note that FIG. 8 provides a timing diagram corresponding to this synchronization and is described below.

In 704, the access point base station may search for a strongest base station (e.g., macro base station) in the neighbor list. In some embodiments, this may be performed by incrementally checking for signal strengths of each of the base stations in the neighbor list. Alternatively, the access point base station may search for the strongest base station by simply detecting base stations providing communication in the area, e.g., using procedures similar to those of access terminals, such as a candidate frequency search (CFS).

In 706, long code acquisition may be performed. Long code acquisition may be similar to initial system time acquisition performed by an access terminal (e.g., demodulating and decoding the SYNC channel message). Accordingly, the state of the access point base station long code may be initialized.

In 708, a propagation delay of the base station (e.g., the macro base station) may be estimated. Propagation delay may be performed by comparing a received system clock value to an actual time value, determining the distance between the access point base station and the clock signal source (e.g., the macro base station), and/or other methods.

In 710, a PN code of the access point base station may be initialized using the propagation delay to provide system time synchronization. This initialization may be performed when the system time counter or clock of the access point base station reaches the following equity: BS_EarlyArrivingPath_Position +(BS_IDMod64−PD)=Fcell_IDMod64, where PD is propagation delay. This is shown and described below in relation to FIG. 8. After 710, the access point base station time as well as the long and short codes may be synchronized to the system time (e.g., as shown in the third timing diagram portion of FIG. 8).

The method may further include adjusting the system time of the access point base station one or more times to provide or maintain system time synchronization. As indicated above, the accuracy of the access point base station time may have a significant impact on its performance as well as the performance of the entire network. The access point base station accuracy may be a function of its VCO accuracy and time tracking/adjustment method employed. The access point base station may be achieved by using one or more of the procedures described below (among other possibilities). Adjusting the time may be performed periodically, in response to detection of a loss of synchronization, or in response to a synchronization message from the service provider (e.g., when the service provider detects that a loss of synchronization has occurred).

Adjusting the system time may include clock slew rate calibration, time tracking using an RL signal, time tracking using procedures similar to CFS (Candidate Frequency Search), and/or timing resynchronization request messages (e.g., in response to a request from the service provider), possibly over an OAM interface (among other possible adjustment methods).

More specifically, adjusting the system time may include using clock calibration (e.g., slew rate calibration) of a clock of the access point base station. For example, the access point base station slew-rate may be characterized and the correction may be applied when the error approaches ½ of a chip (chips are indicated graphically in the timing diagram of FIG. 8).

Alternatively, or additionally, adjusting the clock may include tracking a carrier frequency of an access terminal or base station and calibrating timing of the access point base station according to the carrier frequency. For example, adjusting may include continuous time tracking where the clock of the access point base station may be adjusted based on the estimation of the carrier frequency signal received by the access point base station. This may occur in two different modes. In traffic mode (where the access point base station is in communication with one or more access terminals or base station), the access point base station may track the carrier frequency of an access terminal up link and perform system time correction. The access point base station may then periodically correct its timing using a clock-slew calibration table or periodically tune its receiver to the neighbor base station downlink performing procedures similar to CFS. Note that this may be performed at other times or independently of time tracking procedures, as desired. In idle mode, when the access point base station is inactive for a period longer than the required time accuracy, the access point base station may perform CFS and time correction.

As indicated above, the access point base station may receive a time re-sync command from the service provider when it determines a loss of link synchronization with the surrounding network (e.g., during a handoff when one or more of the access point base station, the access terminal, and another base station report conflicting times). Similar to above, the adjustment may be performed differently depending on the conditions. In traffic mode, the access point base station may perform CFS (e.g., acquiring neighbor base station downlink), e.g., during a time when no access terminal is schedule or when there is low activity on the circuit switch link. In inactive mode, the access point base station may adjust the system time by simply synchronizing with a macro base station (e.g., as in 704, 706, 708, and 710 above). Note that this type of resynchronization may occur independently of a resync command from network, as desired.

FIG. 8 illustrates an exemplary timing graph including the system time, the access point base station system time during acquisition, and the access point base station timing (for communication with access terminals) after synchronization. More specifically, the system time indicates the system time of the service provider (e.g., as maintained by a macro base station with the PN Offset=0). As shown, during acquisition the access point base station system time (labeled as Fcell_ST_CT (Acquisition)) is not synchronized. In this example, the "strongest" macro BS detected by the femto during its initial time acquisition has a PN Offset=42. However, since the access point bas station was activated in the arbitrary time it detected the macro BS somewhere between Offset 2 and Offset 3. The bold arrow at 42 in the system time and between Offset 2 and Offset 3 indicates the detection of 42 by the access point base station between Offset 2 and Offset 3. Accordingly, the access point base station adjusts the system timing by the propagation delay amount and further adjusts the system time to match the system time when time 208 is reached. Finally, at 208, the access point base station may begin providing wireless communication for access terminals using its PN offset and long code.

In 902, an assignment message may be received from a service provider as in 602 above. Note that in some embodiments, the method of FIG. 9 may be particularly devoted to asynchronous systems utilizing a scrambling code. Accordingly, in such embodiments, the parameters may not include a PN offset and may not include adjusting a system clock of the access point base station. Instead, the synchronization may be performed to achieve slot and frame boundary synchronization, as described below.

Figure 9:
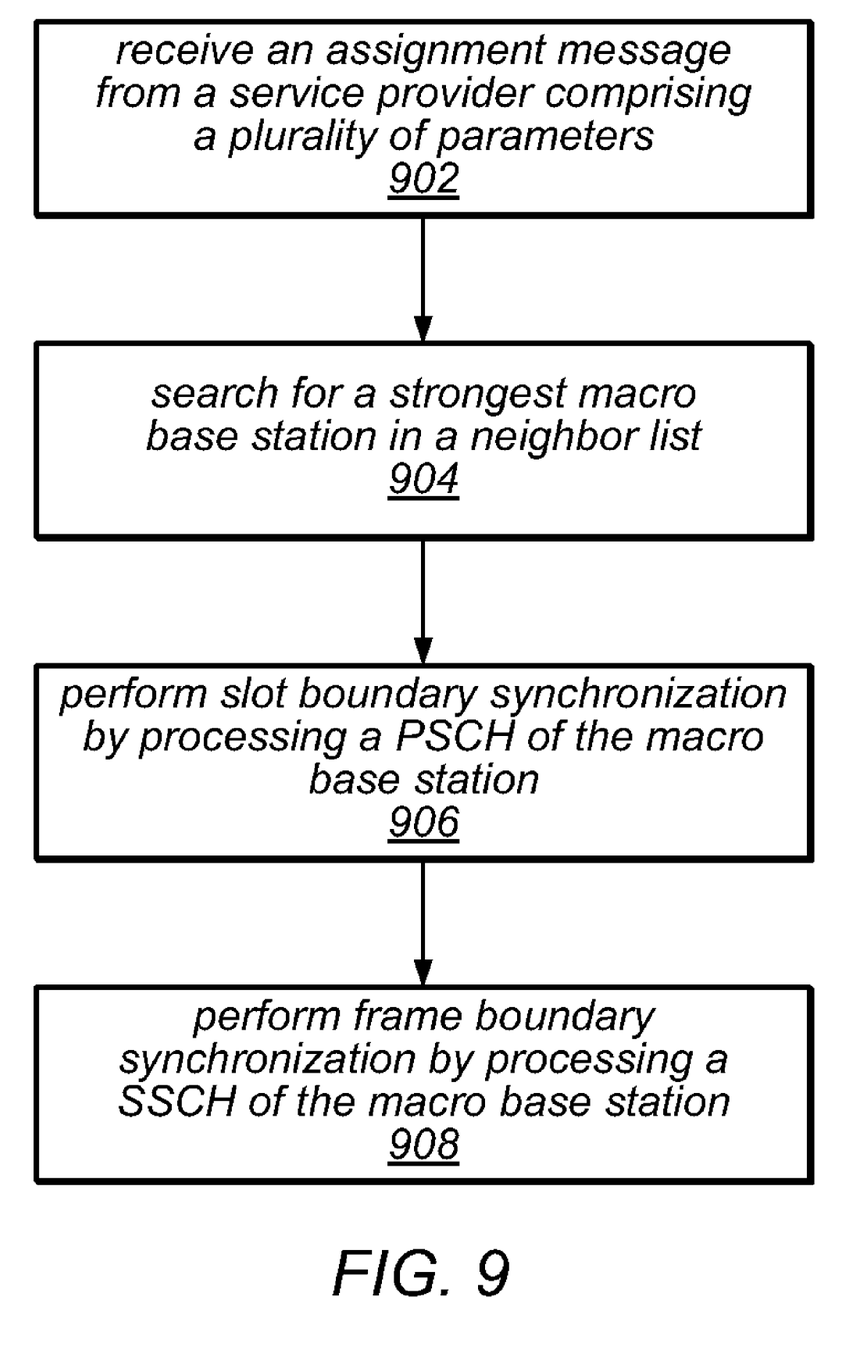
FIG. 9 is a timing diagram corresponding to the method of FIG. 8, according to one embodiment.

Similar to above, performance and hand off procedures of the access point base station may be affected by timing synchronization. Accordingly, the access point base station may begin a synchronization process to synchronize timing of the access point base station with the macro base station/service provider timing. The synchronization process may include 904, 906, and/or 908 described below. Additionally, in some embodiments, the synchronization process may include (e.g., initially) tuning a receiver of the access point base station to a neighbor downlink frequency (e.g., of a macro base station) specified in the neighbor list.

In 904, the access point base station may search for a strongest base station (e.g., macro base station) in the neighbor list as in 704 above.

Figure 10:
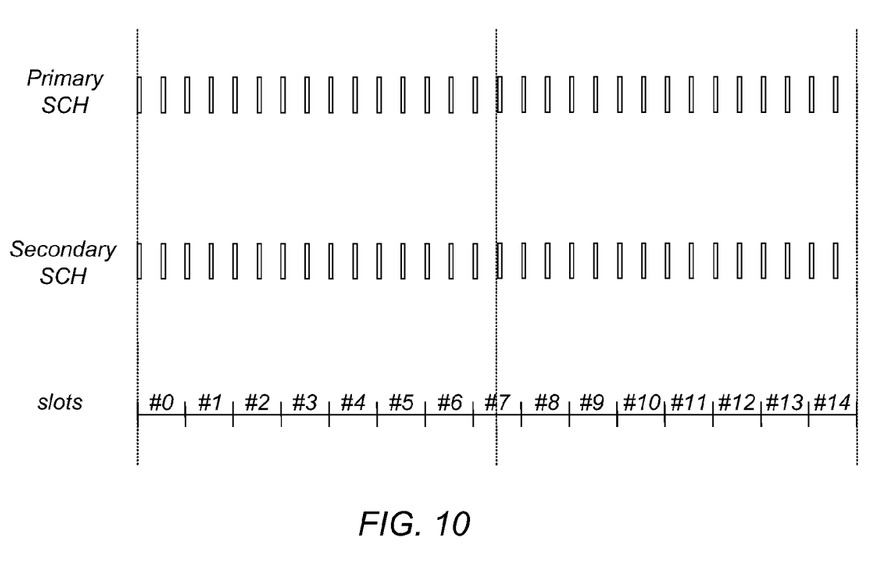
FIG. 10 is a diagram illustrating the output of PSCH and secondary synchronization channel (SSCH) from a neighboring base station as well as slots within a frame.

In 906, slot boundary synchronization may be performed. In some embodiments, slot boundary synchronization may be performed by processing a primary synchronization channel (PSCH) of the base station. FIG. 10 illustrates the output of PSCH and secondary synchronization channel (SSCH) from a neighboring base station as well as slots within a frame. As shown, there may be 15 slots (0-14) within a frame. Accordingly, initially, the access point base station may perform timing synchronization according to slots by detecting and adjusting to signals provided over the PSCH. The access point base station may also receive other information using the PSCH for performing frame boundary synchronization using the SSCH in 808 (e.g., such as the scrambling code).

In 908, frame boundary synchronization may be performed. In some embodiments, this may be performed by processing SSCH of the base station. The SSCH may change its scrambling code on each frame. Accordingly, by detecting the scrambling code change (e.g., by acting as an access terminal), the access point base station may achieve frame boundary synchronization. Thus, the access point base station may initially synchronize its timing using signals from another base station.

Similar to descriptions of the method of FIG. 7 above, the method may further include adjusting timing of the access point base station (e.g., to achieve frame synchronization). Adjusting the timing may be performed periodically, in response to detection of a loss of synchronization, or in response to a synchronization message from the service provider (e.g., when the service provider detects that a loss of synchronization has occurred).

In some embodiments, adjusting the timing of the access point base station may include using clock calibration of a clock of the access point base station. Alternatively, or additionally, adjusting the clock may include tracking a carrier frequency of an access terminal or base station and calibrating timing of the access point base station according to the carrier frequency. In some embodiments, adjusting the system time may simply include the access point base station synchronizing with a macro base station (e.g., as in 904, 906, ad 908 above).

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for performing time synchronization of an access point base station with a timing of a macro base station, the method comprising:

receiving an assignment message from a service provider, wherein the assignment message comprises a neighbor list, and the neighbor list comprises a signal strength of the macro base station and the timing of the macro base station; and synchronizing the access point base station with the macro base station, wherein the synchronizing comprises:
searching for a strongest macro base station in the neighbor list according to the signal strength;
performing slot boundary synchronization by processing a PSCH (primary synchronization channel) of the macro base station; and
performing frame boundary synchronization by processing a SSCH (secondary synchronization channel) of the macro base station to detect scrambling code change on each frame:
wherein the step of performing the slot boundary synchronization and the step of performing the frame boundary synchronization provides frame synchronization between the access point base station and the macro base station.

2. The method of claim 1, further comprising:
connecting to the service provider, wherein the access point base station provides wireless communication in a local area for one or more access terminals, and wherein the service provider provides wireless communication in a macro area via the macro base station; and
transmitting an activation request message to the service provider;
wherein the connecting step and the transmitting step are performed prior to the step of receiving the assignment message.

3. The method of claim 1, wherein the step of receiving the assignment message and the step of synchronizing the access point base station with the macro base station is performed over an IP connection.

4. The method of claim 1, further comprising: adjusting a timing of the access point base station one or more times to provide frame synchronization.

5. The method of claim 4, wherein said the step of adjusting the timing comprises the access point base station synchronizing with the macro base station.

6. The method of claim 4, wherein the step of adjusting is performed in response to a message received from the service provider.

7. The method of claim 1, wherein the assignment message further comprises:
an access point base station frequency assignment;
a network identifier;
an access point base station identifier; and
a scrambling code.

8. A femtocell, comprising:
an interface for providing communication with one or more access terminals in a local area and providing communication with a service provider in a macro area via a macro base station;
a processor coupled to the interface;
a memory medium coupled to the processor, wherein the memory medium comprises program instructions executable to:
receive an assignment message from the service provider, wherein the assignment message comprise a neighbor list and the neighbor list comprises a signal strength of the macro base station; and
synchronize with the macro base station, wherein the synchronizing comprises:

searching for a strongest macro base station in the neighbor list according to the signal strength;

performing slot boundary synchronization by processing a PSCH (primary synchronization channel) of the macro base station; and performing frame boundary synchronization by processing a SSCH (secondary synchronization channel) of the macro base station to detect scrambling code change on each frame;

wherein the step of performing the slot boundary synchronization and the step of performing the frame boundary synchronization provides frame synchronization between the femtocell and the macro base station.

9. The femtocell of claim 8, wherein the program instructions are further executable to:

adjust a system time of the femtocell one or more times to provide system time synchronization.

10. A communication system for providing wireless communication with one or more access terminals, comprising:

a service provider;

a macro base station for providing wireless communication with the one or more access terminals in a macro area; and an access point base station for providing wireless communication with the one or more access terminals in a local area intersected partially with the macro area, and wherein the access point base station is configured to:

receive an assignment message from the service provider, wherein the assignment message comprise a neighbor list, and the neighbor list comprises a signal strength of the macro base station; and synchronize with the macro base station, wherein the synchronizing comprises:

searching for a strongest macro base station in the neighbor list according to the signal strength;

performing slot boundary synchronization by processing a PSCH (primary synchronization channel) of the macro base station; and performing frame boundary synchronization by processing a SSCH (secondary synchronization channel) of the macro base station to detect scrambling code change on each frame;

wherein the step of performing the slot boundary synchronization and the step of performing the frame boundary synchronization provides frame synchronization between the femtocell and the macro base station.

* * * * *